March 29, 1938.  W. A. BOHANNON ET AL  2,112,263
ICE TRAY RACK
Filed June 9, 1936
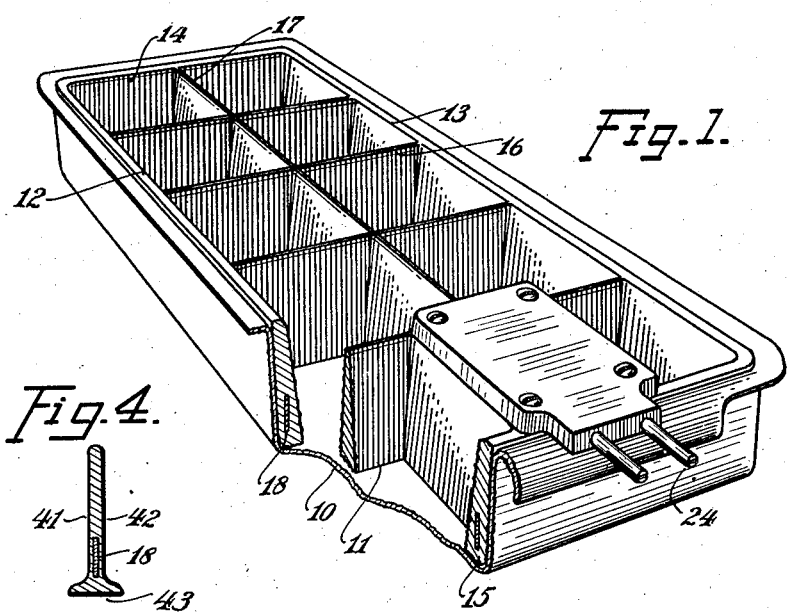
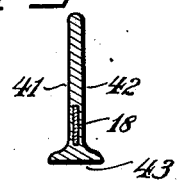
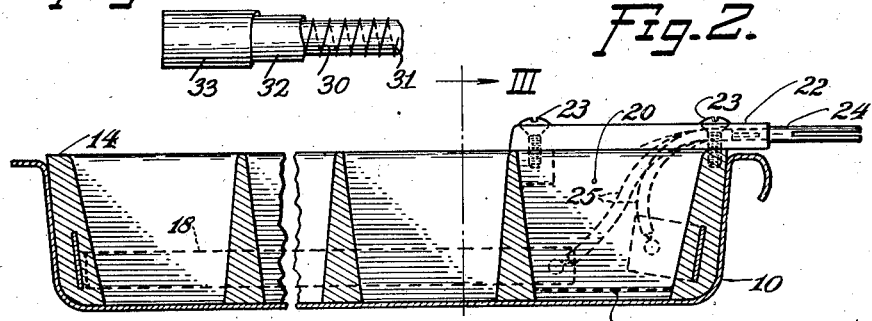
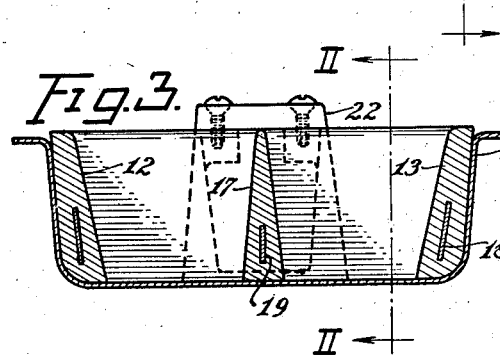
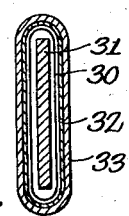
INVENTORS
WILLIAM A. BOHANNON
BY and CLARA B. GILBERT.
ATTORNEY Patented Mar. 29, 1938

2,112,263

UNITED STATES PATENT OFFICE 2,112,263

ICE TRAY RACK

William A. Bohannon and Clara B. Gilbert, Hewlett, N. Y.

Application June 9, 1936, Serial No. 84,272

5 Claims. (Cl. 62—108.5)

This invention relates to tray racks for electrical or other types of refrigerators, is particularly concerned with means for releasing the frozen contents of such trays by the introduction of heat, and comprises improvements over our co-pending application Serial No. 47,260, filed October 29, 1935, now Patent No. 2,061,891, granted November 24, 1936.

The improvements meet the same objectives as are outlined in said previous application, but are organized to provide a more efficient and easily operated device. Further, we include certain structural improvements in the device which are designed to facilitate fabrication and reduce cost of production.

Generally, the invention comprises a removable rack for insertion in a standard ice cube tray as utilized in known types of refrigerators, the rack preferably being made as a casting of non-ferrous metal, the rack including a plurality of longitudinal and transverse walls defining substantially cubical spaces open at the top and bottom. In the previous application, a somewhat similar structure is shown and described, but the rack is not bordered by integral walls, whereas the present invention includes such walls which are adapted to make contact with the normal walls of the ice tray within which the rack is fitted. We embed electric heater elements in the border walls of the rack—both longitudinal and transverse border walls—and also in certain of the intermediate longitudinal walls so that, when these heater elements are energized by the application of electric current, the several walls in which heater elements are embedded are quickly warmed, and certain of those walls which do not carry heater elements are likewise quickly warmed by conduction of heat from the heated walls. In the embodiment described in said co-pending application, we found that certain difficulties arose. In that embodiment heater elements are included in the longitudinal walls spaced from the sides of the ice tray, and it is found that although frozen ice cubes are quickly released from the central parts of the rack, release is delayed where the cubes contact the sides of the tray itself, since heat transmission is slow from the transverse rack walls to the tray walls. A further difficulty is experienced with the devices of the previous application since, when the heater elements are energized, an undue length of time is consumed in warming the tray itself in an amount sufficient to defrost the exterior of said tray by which the tray as a unit can be readily removed from the refrigerator where frequently, it becomes firmly locked by moisture which accumulates and freezes on the exterior of the tray. A still further objection, which the present invention overcomes, is the tendency for the outer ice cubes to drop from the rack when the rack is lifted from the tray. This is overcome in the present invention by the inclusion of bordering walls, whereby the cubes are adequately held in the rack until the rack is inverted and the cubes are deposited where they are wanted. In the present invention, as well as in the previous invention, it should be pointed out that our construction overcomes certain difficulties which are experienced with prior art devices. In such prior art devices, heater elements are provided in a tray having an integral rack, and when such a tray is inverted for the purpose of dumping the ice cubes, although the cubes are no longer frozen to the rack or tray, they will not drop out, due to the lack of air relief on the bottoms of the cubes where they contact the bottom of the tray. In the present invention, which utilizes a removable rack, one end of the rack may be tilted with respect to the tray, by which air relief is provided below the ice cubes to expedite their removal. Thereupon, the rack, with the contained cubes, may be removed to a suitable receptacle, inverted, and the cubes immediately drop out with no further ado.

This invention has for objects, the overcoming of certain objections in the prior art devices, and also to provide a more effective and efficient ice cube rack.

A further object of the invention is to provide a simple and readily fabricated structure by which the rack may be produced economically.

The specific organization is clearly shown in the accompanying drawing, in which:

Fig. 1 is a perspective view, partly broken away, showing the rack construction;

Fig. 2 is a longitudinal section through the rack and tray, being a section on the line 2—2 of Fig. 3;

Fig. 3 is a transverse section through the rack, being a section on the line 3—3 of Fig. 2;

Fig. 4 is a cross-section of an alternative form of rack wall;

Fig. 5 is a fragmentary side elevation of one of the heater elements, and

Fig. 6 is an enlarged transverse section of one of said heater elements.

The drawing shows a conventional pressed metal tray 10 which normally is fabricated of a non-ferrous material such as aluminum, this tray being well known and standard. Within this tray, the rack 11 is adapted for fitting engagement, the rack comprising longitudinal bordering walls 12 and 13, a transverse end wall 14 and a transverse end wall 15 through which certain of the heater elements are adapted to extend. The rack further comprises a plurality of transverse intermediate walls 16 and, as shown, a central longitudinal wall 17, although a plurality of such walls 17 may obviously be provided. The rack 11 comprises an integral casting of aluminum or other preferably non-ferrous metal adapted for casting at relatively low temperature. Within the walls 12, 13, and 17 are embedded electric heater elements of commercial pattern, the preferable type of heater element comprising a ribbon of resistance wire 30, wound upon a strip mica core 31, the ribbon then being encased in mica 32 and the thus formed unit in turn encased in a flat metallic tube 33 (see Figs. 5 and 6) which may conveniently be pressed around the mica. This form of heater unit is adapted for operation at or subjection to rather high temperatures, well in excess of the casting temperature of the non-ferrous metal comprising the rack. In the fabrication of the rack, then, the heater elements which are designated as to the walls 12 and 13, as 18, and as to the wall 17, as 19, are supported by suitable chaplets in the mold, and the molten metal is then cast to form the rack and to embed the heater elements 18 and 19 in the rack material by which an excellent thermo contact is established between the rack walls and the heater elements. This construction in itself is a distinct improvement over prior constructions where heater elements are inserted into openings in the rack walls or embedded in the rack walls with an insulating material which, of course, not only acts as an electrical insulator but also as a thermal insulator.

It has been proven by experiment that it is not only desirable but more or less essential that the heater elements be tightly sealed within the metal of the rack or grid. Should this be not effected, condensation caused by extreme temperature changes and transmitted by and through the intervening air space, will ultimately ruin or destroy the heater elements. Hence the adoption, as herein shown, of flat heater elements, encased in a sheathing of metal around which is cast the metal of the tray. The shrinkage of the metal, in cooling, develops a tremendous pressure, which pressure, in and of itself, entirely and completely seals the elements in place. Heat conductivity is accordingly greatly increased by the pressures thus induced. By virtue of this tight seal the time interval for effecting heat transfer between the heater elements and the walls of the rack is greatly reduced, thus rendering the rack much more efficient in its functioning.

The several walls of the rack are made of tapered form in cross-section, as shown, to provide draft for the ice cubes by which they may easily be removed after their bond with the rack has been broken by the application of heat, and the tapered conformation likewise permits of removal of the rack 11 from the tray 10 with the ice cubes, after which the rack may be inverted to discharge them. The longitudinal border walls 12 and 13 of the rack prevent inadvertent discharge of the ice cubes. Likewise, these walls, since they are in close thermal contact with the tray 10, permit of an effective transfer of heat to the tray 10 by which said tray may easily be withdrawn from a refrigerator freezing compartment where, as is well known, trays are very apt to stick by virtue of the frosting of the mechanism whereby atmospheric moisture or inadvertent spillage from the ice trays firmly freezes the tray as a whole in the refrigerator, making removal difficult. Therefore, this invention provides not only for ready removal of ice cubes from a tray after it has been removed from a refrigerator, but also permits of ready removal of the tray as a unit from the refrigerator.

At one end of the rack, a well 20 is provided, said well having a bottom wall 21 and serving as a connection box for the terminal ends of the heater elements 18 and 19. This well is adapted to be covered by an insulating plate 22 formed of molded plastic or the like, which plate is screwed by screws 23 to the rack, the plate also carrying connectors 24 from which wires 25 extend into the well 20 for connection to the heater element terminals in a manner well known in the art.

In Fig. 4 I show an alternate form of rack wall, containing a heater element as described, this wall having parallel upper surfaces 41 and 42 and having a T-form base 43 adapted for contact with the bottom of the ice tray. The flanges of this component 43 serve to effect good thermal contact between the wall and the tray and likewise serve to lift the ice cubes with the rack when the latter is removed from the tray, to break the seal which normally exists between the surface of the tray and the bottom of the ice cube.

The subject invention has been evolved as a result of much experimentation, to provide a device which is commercially practicable and which is efficient in use, since prior art devices of the same order have been found wanting in both of these respects.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

What is claimed is:

1. A removable ice-cube tray-rack adapted for fitting engagement in a refrigerator ice-tray, said rack being open top and bottom and comprising side, end and partition walls arranged to define a plurality of substantially cubical spaces within which ice is adapted to form, all of said walls being wider in cross section at the bottom than at the top, and said side and end walls being substantially coextensive with the corresponding side and end walls of said tray whereby when ice is formed within said rack adhesion between it and the end and side walls of the tray is prevented, an electrical heater element housed in each side and end wall of said rack, and a contact member carried by said rack and in electrical communication with said heater element.

2. A removable ice-cube tray-rack adapted for fitting engagement in a refrigerator ice-tray, said rack being open top and bottom and comprising side, end and partition walls arranged to define a plurality of substantially cubical spaces within which ice is adapted to form, said side and end walls being substantially coextensive with the corresponding side and end walls of said tray whereby good thermal contact between said walls and extending substantially continuously around said rack is established, electrical heater elements housed in each side and end wall of said rack adapted, when energized, to break the adhesion between the formed ice and the side and end walls of said rack as well as the adhesion between said walls and the corresponding walls of said tray, an additional heater element housed in one or more of said partition walls adapted, when energized, to break the adhesion between the formed ice and said partition walls, and a contact member carried by said rack and in electrical communication with said heater elements.

3. In a removable ice-cube tray-rack adapted for fitting engagement in a refrigerator ice-tray, said rack being open top and bottom and comprising side, end and partition walls arranged to define a plurality of substantially cubical spaces within which ice is adapted to form, said side and end walls being substantially coextensive with the corresponding side and end walls of said tray whereby good thermal contact between said walls and extending substantially continuously around said rack is established, a metal sheathed heater element embedded in each side and end wall of said rack adapted, when energized, to break the adhesion between the formed ice and the side and end walls of said rack as well as the adhesion between said walls and the corresponding walls of said tray, an additional metal sheathed heater element housed in one or more of said partition walls adapted, when energized, to break the adhesion between the formed ice and said partition walls, and a contact member carried by said rack and in electrical communication with said heater elements.

4. As an article of manufacture, a bodily removable ice-cube tray-rack adapted for fitting engagement in a refrigerator ice-tray, said rack being open top and bottom and comprising structurally rigid side, end and partition walls arranged to define a plurality of substantially cubical spaces within which ice-cubes are adapted to form, said partition walls being wider in cross-section at the bottom than at the top whereby when said rack is bodily lifted from the tray the ice-cubes are correspondingly lifted and held from falling through the open bottom ends of said cubical spaces by the partition wall enlargements, and means for introducing heat to said rack to break adhesion between it and the ice-cubes as well as between it and the walls of said tray, the introduced heat, by radiation, being adapted also to break adhesion between the ice-cubes and the bottom of the tray.

5. A removable grid adapted for fitting engagement in a refrigerator ice-tray, said grid being open top and bottom and comprising side, end and partition walls arranged to define a plurality of spaces or compartments within which ice-cubes are adapted to form, said side and end walls being substantially coextensive with the corresponding side and end walls of said tray whereby when ice is formed within said grid, adhesion between it and the end and side walls of the tray is prevented, an electrical heater element housed within a wall of said grid adapted by heat radiation to break the adhesion between the grid and the ice-cubes, between the grid and the tray and between the tray and the ice-cubes, and a contact element carried by said grid and in electrical communication with said heater element and by means of which the introduction of heat to said grid is controlled.

WILLIAM A. BOHANNON.
CLARA B. GILBERT.